US009634848B2

(12) United States Patent
DeLucca et al.

(10) Patent No.: US 9,634,848 B2
(45) Date of Patent: *Apr. 25, 2017

(54) MESSAGE BROADCASTING IN A CLUSTERED COMPUTING ENVIRONMENT (71) Applicant: International Business Machines Corporation, Armonk, NY (US)

(72) Inventors: Albert DeLucca, Wantagh, NY (US); Lisa Seacat DeLuca, San Francisco, CA (US); Brian D. Goodman, Brooklyn, NY (US); Angel E. Tomala-Reyes, Flushing, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/182,838

(22) Filed: Jun. 15, 2016

(65) Prior Publication Data

US 2016/0301537 A1  Oct. 13, 2016

Related U.S. Application Data (63) Continuation of application No. 14/875,810, filed on Oct. 6, 2015, now Pat. No. 9,444,636, which is a
(Continued)

(51) Int. Cl.
*G06F 15/16* (2006.01)
*H04L 12/18* (2006.01)
(Continued)

(52) U.S. Cl.
CPC ...... *H04L 12/1827* (2013.01); *H04L 12/1854* (2013.01); *H04L 12/1886* (2013.01);
(Continued)

(58) Field of Classification Search
CPC .......................... H04L 29/08909; H04L 45/46
(Continued)

(56) References Cited

U.S. PATENT DOCUMENTS 5,245,607 A   9/1993  Caram
7,013,330 B1  3/2006  Tarbotton et al.
(Continued)

OTHER PUBLICATIONS

Maitland, J., "Keeping Control Isn't Easy", Chapter 4: Cloud-Based Infrastructure, SearchCloudComputing.com, Publication Date: Oct. 2009, 17 pages.
(Continued)

*Primary Examiner* — El Hadji Sall
(74) *Attorney, Agent, or Firm* — William H. Hartwell; Madeline F. Schiesser; Keohane & D'Alessandro PLLC (57) ABSTRACT Approaches are provided for message broadcasting within a clustered computing environment such as a Cloud computing environment. Specifically, a message received from message queue (e.g., on a message queue server) is processed at a single node of a plurality of nodes within the clustered computing environment. The single node can be selected based on factors such as a best available node within the plurality of nodes. This single node identifies a set of message listeners to whom the message should be broadcast (e.g., based on a topic of the message and an association of the topic to the set of message listeners). The single node then publishes the message to the set of message listeners. Delivery confirmations, responses, etc. associated with the message are then tracked, processed, and/or routed by the single node.

20 Claims, 5 Drawing Sheets

Related U.S. Application Data continuation of application No. 12/783,946, filed on May 20, 2010, now Pat. No. 9,191,236.

(51) Int. Cl.
*H04L 12/58* (2006.01)
*H04L 12/725* (2013.01)
*H04L 29/08* (2006.01)

(52) U.S. Cl.
CPC ........ *H04L 12/5855* (2013.01); *H04L 45/308* (2013.01); *H04L 51/14* (2013.01); *H04L 51/34* (2013.01); *H04L 67/10* (2013.01); *H04L 67/141* (2013.01)

(58) Field of Classification Search
USPC ........................................ 709/206, 203, 217
See application file for complete search history.

(56) References Cited

U.S. PATENT DOCUMENTS

| | | | |
|---|---|---|---|
| 7,454,716 | B2 | 11/2008 | Venolia |
| 7,624,144 | B1 | 11/2009 | Mitrov |
| 8,819,701 | B2 | 8/2014 | Wheeler et al. |
| 9,191,236 | B2 | 11/2015 | DeLucca et al. |
| 2002/0123997 | A1 | 9/2002 | Loy et al. |
| 2004/0240462 | A1 | 12/2004 | TV et al. |
| 2006/0117101 | A1 | 6/2006 | Lauer et al. |
| 2006/0184694 | A1 | 8/2006 | Monette et al. |
| 2007/0118841 | A1 | 5/2007 | Driver et al. |
| 2008/0034051 | A1 | 2/2008 | Wallis et al. |
| 2008/0040628 | A1 | 2/2008 | Mandal |
| 2008/0196039 | A1 | 8/2008 | Garrard et al. |
| 2008/0270531 | A1 | 10/2008 | Revanura |
| 2009/0006546 | A1 | 1/2009 | Blumrich et al. |
| 2009/0113452 | A1 | 4/2009 | Grigsby et al. |
| 2009/0177484 | A1 | 7/2009 | Davis et al. |
| 2011/0289159 | A1 | 11/2011 | DeLucca et al. |
| 2016/0028555 | A1 | 1/2016 | DeLucca et al. |

OTHER PUBLICATIONS

Mell, et al., "The NIST Definition of Cloud Computing", National Institute of Standards and Technology, Information Technology Laboratory, Version 15, Oct. 7, 2009, 2 pages.
International Search Report for International Application No. PCT/EP2011/057860, Dated Sep. 6, 2011.
U.S. Appl. No. 12/783,946, USPTO Office Action, Mail Date Feb. 17, 2012, 22 pages.
U.S. Appl. No. 12/783,946, USPTO Final Office Action, Mail Date Oct. 1, 2012, 16 pages.
U.S. Appl. No. 12/783,946, USPTO Office Action, Notification Date Oct. 10, 2014, 14 pages.
U.S. Appl. No. 12/783,946, USPTO Final Office Action, Notification Date Apr. 30, 2015, 13 pages.
U.S. Appl. No. 12/783,946, USPTO Notice of Allowance and Fee(s) Due, Date Mailed Jul. 9, 2015, 5 pages.
U.S. Appl. No. 14/875,810, USPTO Office Action, Notification Date Mar. 28, 2016, 17 pages.
U.S. Appl. No. 14/875,810, USPTO Notice of Allowance and Fee(s) Due, Date Mailed May 27, 2016, 5 pages.

MESSAGE BROADCASTING IN A CLUSTERED COMPUTING ENVIRONMENT

The present patent document is a continuation of U.S. patent application Ser. No. 14/875,810, filed Oct. 6, 2015, entitled "MESSAGE BROADCASTING IN A CLUSTERED COMPUTING ENVIRONMENT", the entire contents of which are herein incorporated by reference. That application is a continuation of U.S. patent application Ser. No. 12/783,946, filed May 20, 2010, now U.S. Pat. No. 9,191,236, issued Nov. 17, 2015, also entitled "MESSAGE BROADCASTING IN A CLUSTERED COMPUTING ENVIRONMENT", the entire contents of which are herein incorporated by reference.

FIELD OF THE INVENTION

The present invention generally relates to clustered computing environments such as a Cloud computing environment. Specifically, the present invention relates to message broadcasting within a clustered computing environment.

BACKGROUND

Publish/subscribe messaging is an effective method for distributing messages to many listeners. This is ideal when it is desired to support messaging across many listeners (e.g., across a clustered computing environment). However, in many clustered computing environments, multiple heterogeneous nodes are provided that have substantially identical or similar software implementations. In typical messaging approaches, a given message will be delivered to all or many such nodes. Each node receiving a message will then process the message and publish the message to applicable listeners. Such repetition often causes delivery of multiple substantially identical messages (e.g., to the same listener). Moreover, the consumption of resources required for such processing is unnecessarily high.

SUMMARY

In general, embodiments of the present invention provide message broadcasting within a clustered computing environment such as a Cloud computing environment. Specifically, under the present invention, a message received from message queue (e.g., on a message queue server) is processed at a single node of a plurality of nodes within the clustered computing environment. The single node can be selected based on factors such as a best available node within the plurality of nodes. This single node identifies a set of message listeners to whom the message should be broadcast (e.g., based on a topic of the message and an association of the topic to the set of message listeners). The single node then publishes the message to the set of message listeners. Delivery confirmations, responses, etc. associated with the message are then tracked, processed, and/or routed by the single node. Thus, embodiments of the present invention obviate the need for a given message to be delivered to and/or processed by multiple nodes.

A first aspect of the present invention provides a method for message broadcasting in a clustered computing environment using a single node of a set of nodes, the method comprising: processing a message received from a message queue; identifying a set of message listeners to receive the message based on a topic of the message; broadcasting the message to the set of message listeners; publishing the message to the set of message listeners; tracking a message delivery from at least one message listener of the set of message listeners; and routing a message response from at least one message listener of the set of message listeners.

Another aspect of the present invention provides a system for message broadcasting in a clustered computing environment using a single node of a set of nodes, the single node comprising: a bus; processor coupled to the bus; and a memory medium coupled to the bus, the memory medium comprising instructions to: process a message received from a message queue; identify a set of message listeners to receive the message based on a topic of the message; broadcast the message to the set of message listeners; publish the message to the set of message listeners; track a message delivery from at least one message listener of the set of message listeners; and route a message response from at least one message listener of the set of message listeners.

Yet another aspect of the present invention provides a computer program product for message broadcasting in a clustered computing environment using a single node of a set of nodes, the computer program product comprising a computer readable storage device, and program instructions stored on the computer readable storage device, to: process a message receive from a message queue; identify a set of message listeners to receive the message based on a topic of the message; broadcast the message to the set of message listeners; publish the message to the set of message listeners; track a message delivery from at least one message listener of the set of message listeners; and route a message response from at least one message listener of the set of message listeners.

Still yet another aspect of the present invention provides a method for deploying a system for message broadcasting in a clustered computing environment, comprising: providing a computer infrastructure having functionality to: process a message receive from a message queue; identify a set of message listeners to receive the message based on a topic of the message; broadcast the message to the set of message listeners; publish the message to the set of message listeners; track a message delivery from at least one message listener of the set of message listeners; and route a message response from at least one message listener of the set of message listeners.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

For convenience, the Detailed Description has the following sections:

I. Cloud Computing Definitions

II. Detailed Implementation of Embodiments of the Invention

I. Cloud Computing Definitions

It is understood in advance that although this disclosure includes a detailed description on Cloud computing, implementation of the teachings recited herein are not limited to a Cloud computing environment. Rather, the embodiments of the present invention are capable of being implemented in conjunction with any type of clustered computing environment now known or later developed.

In any event, the following definitions have been derived from the "Draft NIST Working Definition of Cloud Computing" by Peter Mell and Tim Grance, dated Oct. 7, 2009, which is cited on an IDS filed herewith, and a copy of which is attached thereto.

Cloud computing is a model for enabling convenient, on-demand network access to a shared pool of configurable computing resources (e.g., networks, servers, storage, applications, and services) that can be rapidly provisioned and released with minimal management effort or service provider interaction. This Cloud model promotes availability and is comprised of at least five characteristics, at least three service models, and at least four deployment models.

Characteristics are as follows:

On-demand self-service: A consumer can unilaterally provision computing capabilities, such as server time and network storage, as needed, automatically without requiring human interaction with each service's provider.

Broad network access: Capabilities are available over a network and accessed through standard mechanisms that promote use by heterogeneous thin or thick client platforms (e.g., mobile phones, laptops, and PDAs).

Resource pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state, or datacenter). Examples of resources include storage, processing, memory, network bandwidth, and virtual machines.

Rapid elasticity: Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: Cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Cloud Software as a Service (SaaS): The capability provided to the consumer is to use the provider's applications running on a Cloud infrastructure. The applications are accessible from various client devices through a thin client interface such as a web browser (e.g., web-based email). The consumer does not manage or control the underlying Cloud infrastructure including network, servers, operating systems, storage, or even individual application capabilities, with the possible exception of limited user-specific application configuration settings.

Cloud Platform as a Service (PaaS): The capability provided to the consumer is to deploy onto the Cloud infrastructure consumer-created or acquired applications created using programming languages and tools supported by the provider. The consumer does not manage or control the underlying Cloud infrastructure including networks, servers, operating systems, or storage, but has control over the deployed applications and possibly application-hosting environment configurations.

Cloud Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying Cloud infrastructure but has control over operating systems, storage, deployed applications, and possibly limited control of select networking components (e.g., host firewalls).

Deployment Models are as follows:

Private Cloud: The Cloud infrastructure is operated solely for an organization. It may be managed by the organization or a third party and may exist on-premises or off-premises.

Community Cloud: The Cloud infrastructure is shared by several organizations and supports a specific community that has shared concerns (e.g., mission, security requirements, policy, and compliance considerations). It may be managed by the organizations or a third party and may exist on-premises or off-premises.

Public Cloud: The Cloud infrastructure is made available to the general public or a large industry group and is owned by an organization selling Cloud services.

Hybrid Cloud: The Cloud infrastructure is a composition of two or more Clouds (private, community, or public) that remain unique entities but are bound together by standardized or proprietary technology that enables data and application portability (e.g., Cloud bursting for load-balancing between Clouds).

A Cloud computing environment is service oriented with a focus on statelessness, low coupling, modularity, and semantic interoperability.

II. Detailed Implementation of Embodiments of the Invention

As indicated above, embodiments of the present invention provide message broadcasting within a clustered computing environment such as a Cloud computing environment. Specifically, under the present invention, a message is received in a message queue (e.g., on a message queue server). From the message queue, the message is sent to a single node of a plurality of heterogeneous nodes within the clustered computing environment. The single node can be selected based on any factor such as a best available node within the plurality of nodes. This single node will process the message and identify a set of message listeners to whom the message should be broadcast. Typically, the set of message listeners is identified based on a topic of the message and an association of the topic to the set of message listeners (e.g., as set forth in a table or the like). In any event, the single node will then publish the message to the set of message listeners. Delivery confirmations, responses, etc. associated with the message will then be tracked, processed and/or routed by the single node. Thus, embodiments of the present invention obviate the need for a given message from having to be delivered to and/or processed by multiple nodes.

Figure 1:
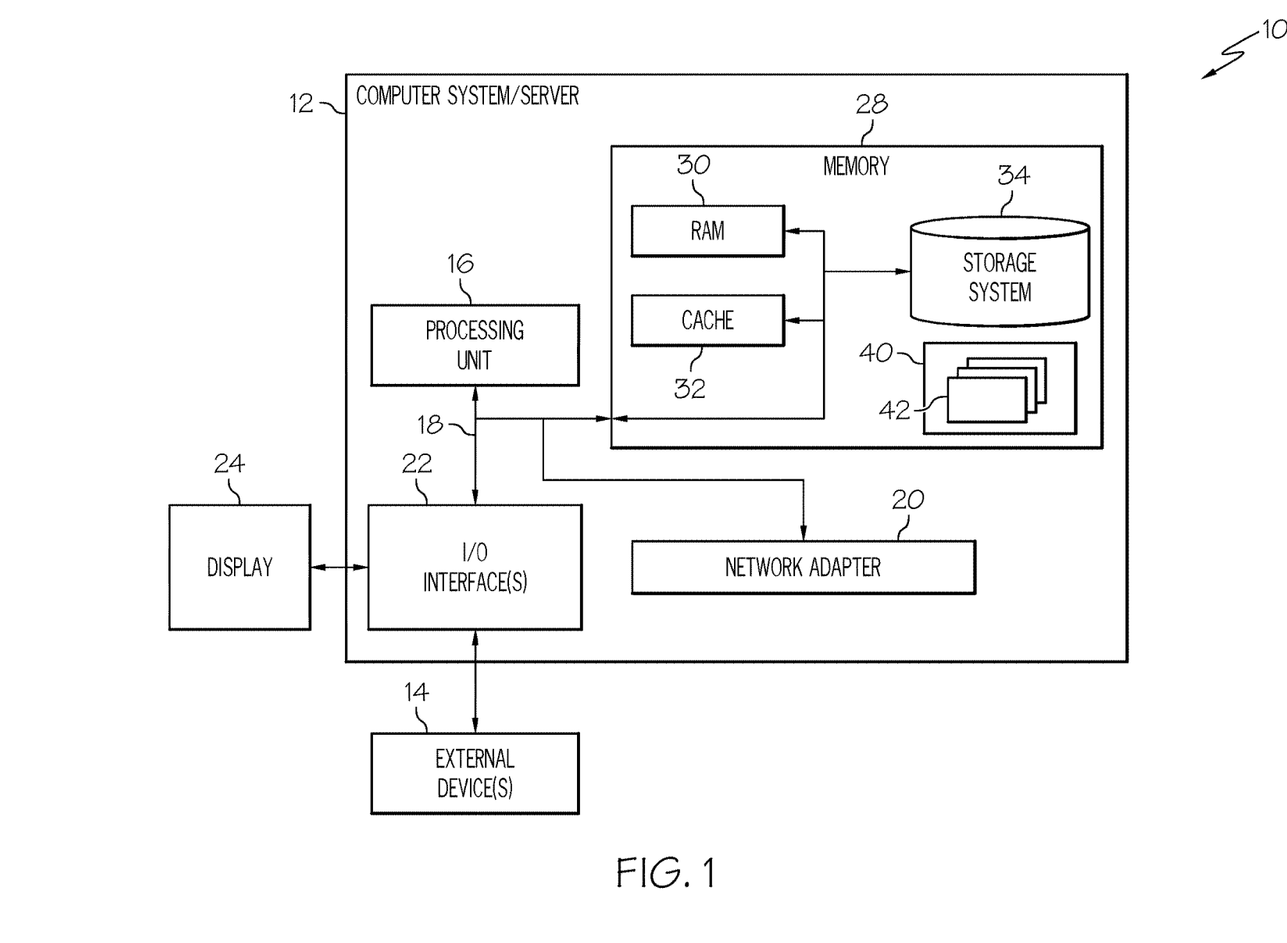
FIG. 1 depicts a Cloud computing node according to an embodiment of the present invention.

Referring now to FIG. 1, a schematic of an exemplary Cloud computing node is shown. Cloud computing node 10 is only one example of a suitable Cloud computing node and is not intended to suggest any limitation as to the scope of use or functionality of the invention described herein. Regardless, Cloud computing node 10 is capable of being implemented and/or performing any of the functions set forth in Section I above.

In Cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed Cloud computing environments that include any of the above systems or devices, and the like.

Computer system/server 12 may be described in the general context of computer system-executable instructions, such as program modules, being executed by a computer system. Generally, program modules include routines, programs, objects, components, logic, data structures, and so on, that perform particular tasks or implement particular abstract data types. The exemplary computer system/server 12 may be practiced in distributed Cloud computing environments where tasks are performed by remote processing devices that are linked through a communications network. In a distributed Cloud computing environment, program modules may be located in both local and remote computer system storage media including memory storage devices.

As shown in FIG. 1, computer system/server 12 in Cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media and removable and non-removable media.

System memory 28 can include computer system readable media in the form of volatile memory, such as random access memory (RAM) 30 and/or cache memory 32. Computer system/server 12 may further include other removable/non-removable and volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of the invention.

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

A computer readable signal medium may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
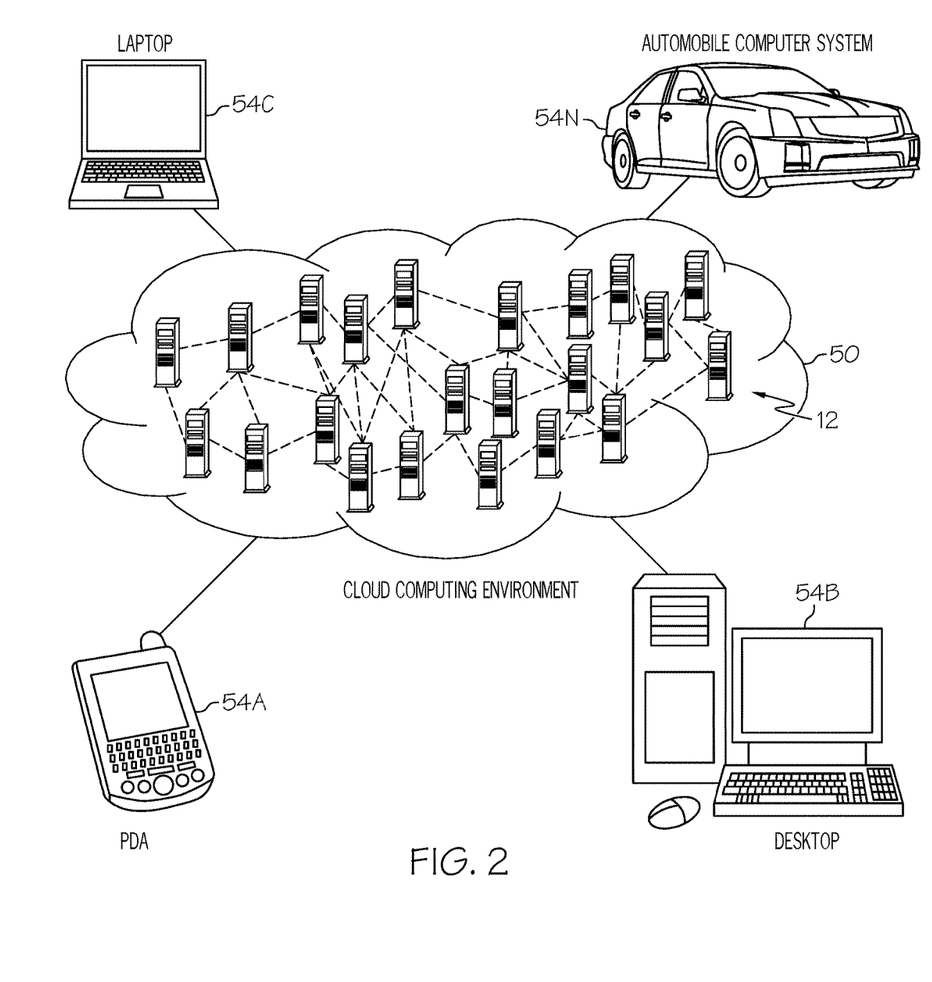
FIG. 2 depicts a Cloud computing environment according to an embodiment of the present invention.

Referring now to FIG. 2, illustrative Cloud computing environment 50 is depicted. As shown, Cloud computing environment 50 comprises one or more Cloud computing nodes 10 with which computing devices such as, for example, personal digital assistant (PDA) or cellular telephone 54A, desktop computer 54B, laptop computer 54C, and/or automobile computer system 54N communicate. This allows for infrastructure, platforms, and/or software to be offered as services (as described above in Section I) from Cloud computing environment 50 so that each client does not have to separately maintain such resources. It is understood that the types of computing devices 54A-N shown in FIG. 2 are intended to be illustrative only and that Cloud computing environment 50 can communicate with any type of computerized device over any type of network and/or network/addressable connection (e.g., using a web browser).

Figure 3:
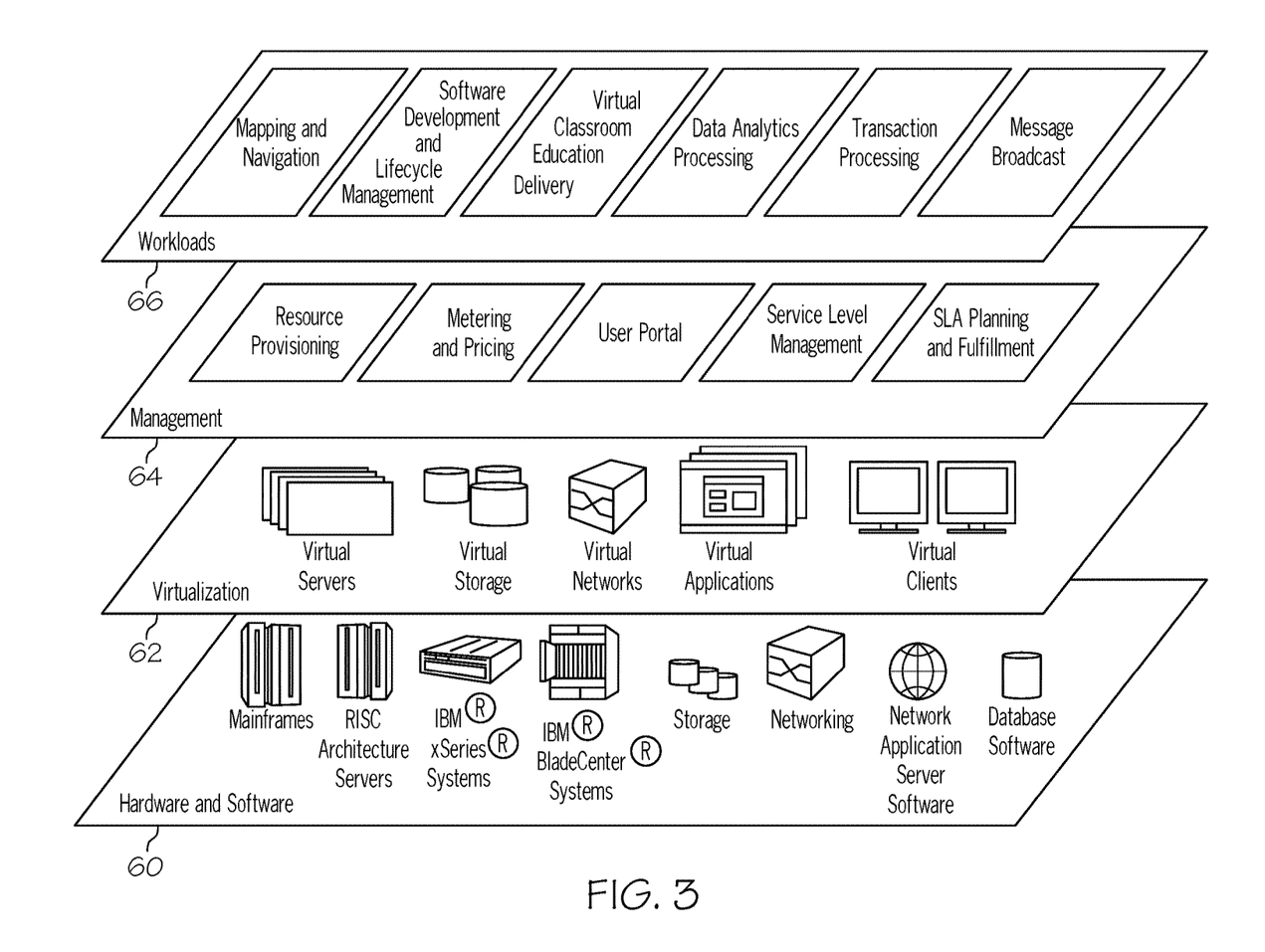
FIG. 3 depicts Cloud abstraction model layers according to an embodiment of the present invention.

Referring now to FIG. 3, a set of functional abstraction layers provided by Cloud computing environment 50 (FIG. 2) is shown. It should be understood in advance that the components, layers, and functions shown in FIG. 3 are intended to be illustrative only, and the invention is not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems; IBM xSeries® systems; IBM BladeCenter® systems; storage devices; networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation in the United States, other countries, or both.)

Virtualization layer 62 provides an abstraction layer from which the following exemplary virtual entities may be provided: virtual servers; virtual storage; virtual networks, including virtual private networks; virtual operating system(s), virtual applications; and virtual clients.

Management layer 64 provides the exemplary functions described below. Resource provisioning provides dynamic procurement of computing resources and other resources that are utilized to perform tasks within the Cloud computing environment. Metering and pricing provide cost tracking as resources are utilized within the Cloud computing environment, and billing or invoicing for consumption of these resources. In one example, these resources may comprise application software licenses. Security provides identity verification for consumers/users and tasks, as well as protection for data and other resources. User portal provides access to the Cloud computing environment for both users and system administrators. Service level management provides Cloud computing resource allocation and management such that required service levels are met. Service Level Agreement (SLA) planning and fulfillment provides pre-arrangement for, and procurement of, Cloud computing resources for which a future requirement is anticipated in accordance with an SLA.

Workloads layer 66 provides functionality for which the Cloud computing environment is utilized. Examples of workloads and functions which may be provided from this layer include: mapping and navigation; software development and lifecycle management; virtual classroom education delivery; data analytics processing; transaction processing; and message broadcasting. As mentioned above, all of the foregoing examples described with respect to FIG. 3 are illustrative only, and the invention is not limited to these examples.

It is understood all functions of the present invention as described herein are typically performed by message broadcast function, which can be tangibly embodied as modules of program code 42 of program/utility 40 (FIG. 1).

It is reiterated that although this disclosure includes a detailed description on Cloud computing, implementation of the teachings recited herein are not limited to a Cloud computing environment. Rather, the embodiments of the present invention are intended to be implemented with any type of clustered computing environment now known or later developed.

One of the primary design patterns for scaling applications is to have substantially identical nodes that perform the same functions. Differentiating like nodes where the program code stays the same is a challenge faced by anyone applying this pattern and, as such, solutions to the problem are of considerable value. Embodiments of the present invention provide a solution for performing localized message publication/subscription with once and only once delivery in a cluster of otherwise substantially identical nodes. This allows for one-to-many messaging to exist at each node of a cluster but have localization of the message (i.e., the message is processed at a single node).

A Cloud computing environment may include at least three parts: a rich web experience; business services; and a Cloud management system. Embodiments of the invention may provide an asynchronous approach and, as such, there is a need to deliver events from the Cloud management system that the rich web experience and business systems can utilize. The web application components may scale in a clone-like fashion where multiple similar nodes provide service for requests. Event processing in accordance with the embodiments of the present invention are handled by only one node at a time. For example, if the status is updated on a Cloud resource (e.g., "success"), that information does not need to be processed by every node in the cluster. In fact, undesirable effects may occur if the messages are processed by every node, potentially by many consumers. To make this model extensible, messages need to reach any one node in a cluster and then get broadcasted locally to the node's context and then consumed by any listeners looking for those messages. This means the message "success" can trigger many actions but is localized to a node and not the cluster, without actual differentiation beforehand. Embodiments of the invention deploy and scale in a manner similar to systems that have like nodes in a cluster, but support localized broadcast messaging with once and only once delivery.

Figure 4:
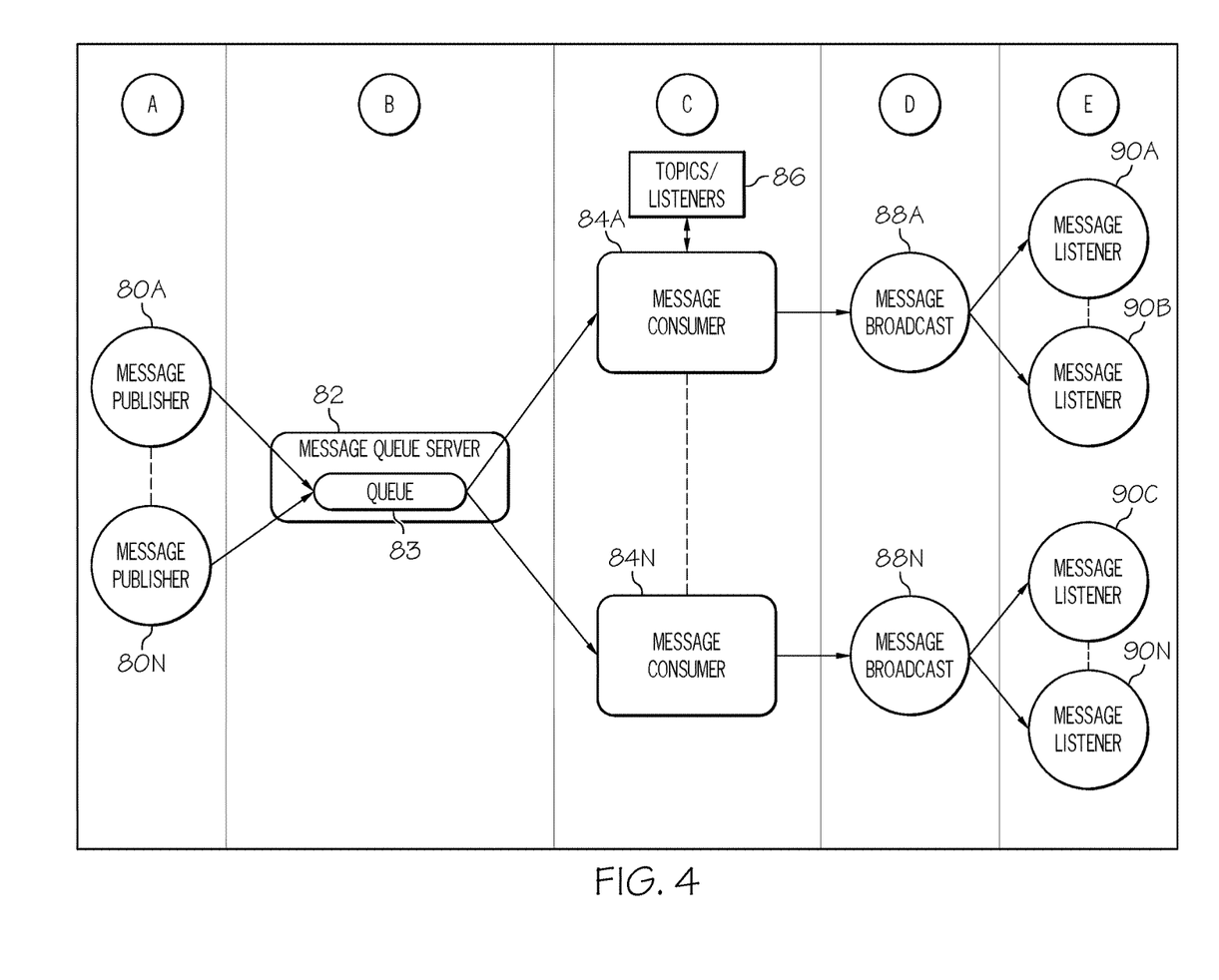
FIG. 4 depicts a system for broadcasting a message within a clustered computing environment according to an embodiment of the present invention.

Referring now to FIG. 4, these concepts will be described in greater detail. As depicted, a set (at least one) of message publishers 80A-N can publish messages to queue 83 of message queue server 82. Under an embodiment of the present invention message queue server 82 will select a single node (e.g., node 84A) from a plurality of like/heterogeneous nodes 84A-N (also referred to as message consumers 84A-N for illustrative purposes). In a typical embodiment, nodes 84A-N are computerized devices such as application servers. To this extent, nodes 84A-N typically have similar or substantially identical software implemented thereon. In any event, the selection of a single node (e.g., node 84A) from plurality of nodes 84A-N by message queue server 82 can be based upon any methodology. For example, the selection could be based on a next-in-line or round-robin fashion. Alternatively, the selection of a particular node could be based upon a best available node (e.g., the node with the most available resources). Regardless, assuming in this example that node 84A was selected, the message would be sent from message queue 83 only to node 84A.

Once in receipt of the message, node 84A would process the same and identify a set of message listeners to whom the message should be broadcast. In a typical embodiment, the set of listeners is identified based upon a topic of the message. That is, once a topic of the message is determined, an association (e.g., table or the like) 86 of topics to corresponding message listeners is accessed and used to determine the message listeners that should receive the message. Once this is determined, the message will be broadcast to those message listeners 90A-B. Broadcasting of the message can occur directly from node 84A, or by leveraging a broadcast component 88A-N. In publishing the message, node 84A can perform all processing functions without the need for repetition by other nodes. Along these lines, node 84A will track a delivery of the message, process and route any responses, etc. As shown in FIG. 4, when a message is sent to a single node 84A, there is no need for node 84N, message broadcast function 88N or message listeners 90C-N to get involved in the process (unless their involvement is desired). This allows delivery and processing of a message to one and only one node 84A.

Figure 5:
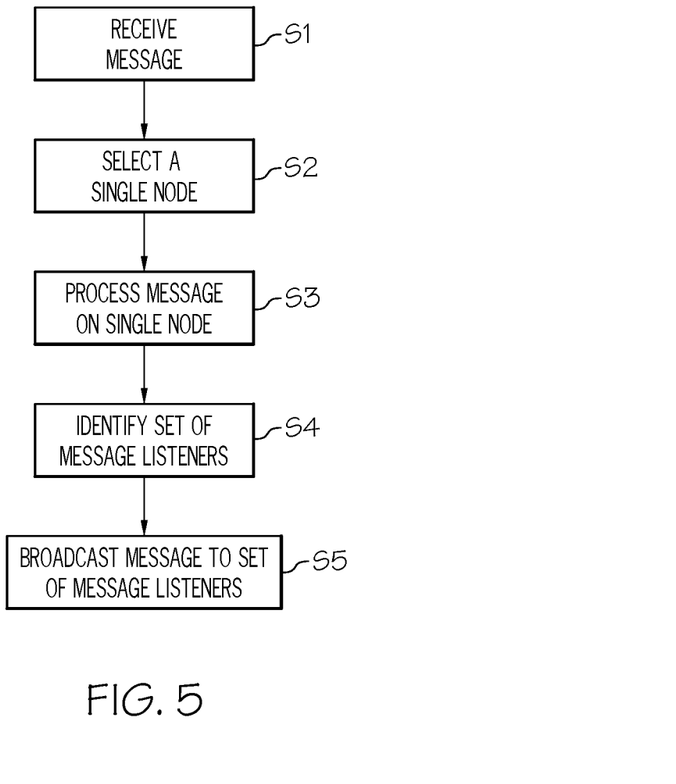
FIG. 5 depicts a method flow diagram according to an embodiment of the present invention.

These concepts are further illustrated by the method flow diagram of FIG. 5. As shown in step S1, a message is received in a message queue. In step S2, a single node is selected from a plurality of nodes. In step S3, the message is processed on the single node. In step S4, a set of message listeners is identified to receive the message based on a topic of the message using the single node. In step S5, the message is broadcast to the set of message listeners from the single node.

While shown and described herein as a message broadcast solution, it is understood that the invention further provides various alternative embodiments. For example, in one embodiment, the invention provides a computer-readable/useable medium that includes computer program code to enable a computer infrastructure to provide message broadcast functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide message broadcast. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for providing message broadcast functionality. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claim is:

1. A method for message broadcasting in a clustered computing environment using a single node of a set of nodes, the method comprising:
processing a message received from a message queue;
identifying a set of message listeners to receive the message based on a topic of the message;
broadcasting the message to the set of message listeners;
publishing the message to the set of message listeners;
tracking a message delivery from at least one message listener of the set of message listeners; and
routing a message response from at least one message listener of the set of message listeners.

2. The method of claim 1, further comprising, based on a set of responses received from the set of message listeners, tracking a receipt of the message by the set of message listeners.

3. The method of claim 1, the single node being an application server and the set of nodes being a set of application servers.

4. The method of claim 1, further comprising associating the topic with the set of message listeners.

5. The method of claim 1, each of the set of nodes having a common set of applications installed thereon.

6. The method of claim 1, the clustered computing environment being a cloud computing environment.

7. The method of claim 1, the received message not being received at any other node of the set of nodes.

8. A system for message broadcasting in a clustered computing environment using a single node of a set of nodes, the single node comprising:
a bus;
a processor coupled to the bus; and
a memory medium coupled to the bus, the memory medium comprising instructions to:
process a message received from a message queue;
identify a set of message listeners to receive the message based on a topic of the message;
broadcast the message to the set of message listeners;
publish the message to the set of message listeners;
track a message delivery from at least one message listener of the set of message listeners; and
route a message response from at least one message listener of the set of message listeners.

9. The system of claim 8, the memory medium further comprising instructions to track, based on a set of responses received from the set of message listeners, a receipt of the message by the set of message listeners.

10. The system of claim 8, the single node being an application server and the set of nodes being a set of application servers.

11. The system of claim 8, the memory medium further comprising instructions to associate the topic with the set of message listeners.

12. The system of claim 8, each of the set of nodes having a common set of applications installed thereon.

13. The system of claim 8, the clustered computing environment being a cloud computing environment.

14. The system of claim 8, the received message not being received at any other node of the set of nodes.

15. A computer program product for message broadcasting in a clustered computing environment using a single node of a set of nodes, the computer program product comprising a computer readable storage device, and program instructions stored on the computer readable storage device, to:
process a message receive from a message queue;
identify a set of message listeners to receive the message based on a topic of the message;
broadcast the message to the set of message listeners;
publish the message to the set of message listeners;
track a message delivery from at least one message listener of the set of message listeners; and
route a message response from at least one message listener of the set of message listeners.

16. The computer program product of claim 15, further comprising program instructions stored on the computer readable storage device to track, based on a set of responses received from the set of message listeners, a receipt of the message by the set of message listeners.

17. The computer program product of claim 15, the single node being an application server and the set of nodes being a set of application servers.

18. The computer program product of claim 15, further comprising program instructions stored on the computer readable storage device to associate the topic with the set of message listeners.

19. The computer program product of claim 15, each of the set of nodes having a common set of applications installed thereon.

20. The computer program product of claim 15, the clustered computing environment being a cloud computing environment.

* * * * *